United States Patent Office 3,349,509
Patented Oct. 31, 1967

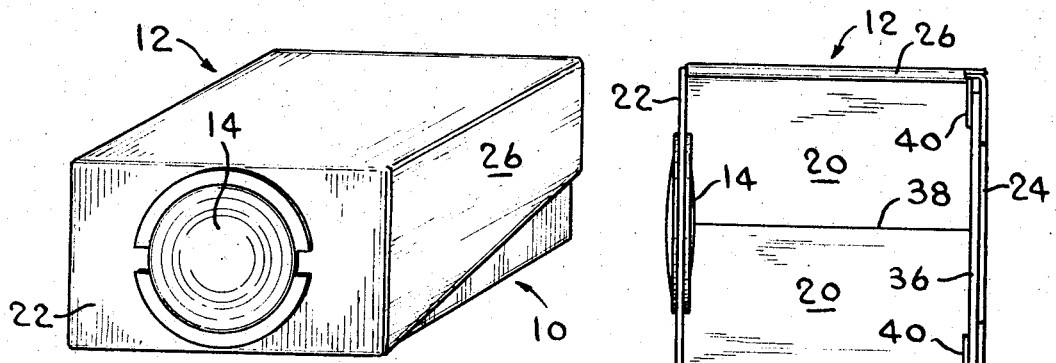
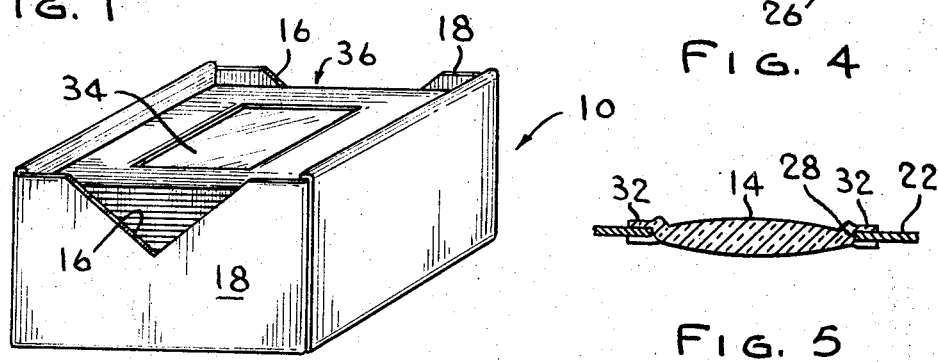
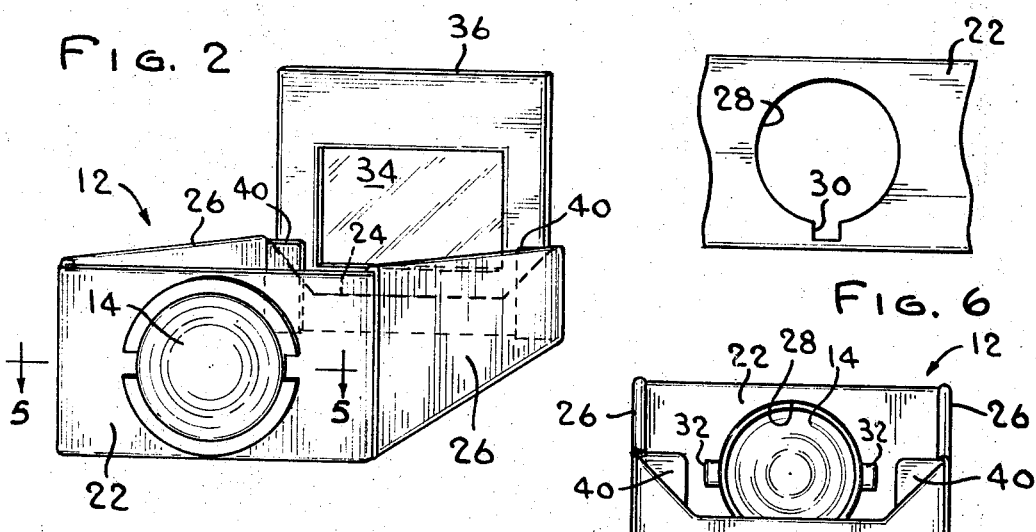

3,349,509
COMBINED SLIDE FILE BOX AND VIEWER
William Balch, Milwaukee, Wis., assignor to Realist Inc., Menomonee Falls, Wis., a corporation of Delaware
Filed Oct. 14, 1965, Ser. No. 495,857
1 Claim. (Cl. 40—63)

ABSTRACT OF THE DISCLOSURE

The cardboard box is used by processor for returning slides to customer who can use it for storage and can use the cover as a viewer. The cover is provided with a lens in one end panel and the opposed panel is cut away to allow clearance for the transparency to be viewed by transmitted light when held erect by the tabs acting on the edge of the mount to hold the mount against the end panel.

---

This invention relates to a slide (mounted transparency) file box which also serves as a viewer.

The principal object of this invention is to provide a box in which mounted transparencies can be stored and which also serves as a viewer for the transparencies.

The present carton can be used for shipping or storing mounted transparencies and the cover is designed to be used as a hand viewer. The cover has a lens and means for holding the slide in viewing position in the focal plane of the lens. The entire unit can be made at low cost and greatly enhances the utility of the box.

Other objects and advantages will be pointed out in, or be apparent from, the specification and claims, as will obvious modifications of the single embodiment shown in the drawings, in which:

FIG. 1 is a perspective view of the assembled slide box;

FIG. 2 shows the cover removed from the box with a number of slides contained therein;

FIG. 3 is a perspective view showing the manner in which the cover of the box is inverted and a slide mounted therein for viewing;

FIG. 4 is a top plan view of the box with a slide in viewing position;

FIG. 5 is a cross section taken as indicated by line 5—5 on FIG. 3 showing the manner of mounting the plastic lens in the box;

FIG. 6 is a fragmentary detail showing the lens aperture in the box without the lens mounted therein; and FIG. 7 is an end view of the viewer or box cover and without a transparency mounted therein to show the construction of the end wall.

The slide box has a bottom 10 and a cover 12 which telescope together in the usual manner to hold a plurality of slides within the box. The box can be used for returning slides to a customer after processing and then can be used by the customer for storage of and viewing the slides. It will be noted that the cover has a lens 14 mounted therein.

When the cover is removed, the slides contained within the box are accessible as shown in FIG. 2 in which the bottom portion of the box has been rotated 90° from the position shown in FIG. 1 to better illustrate the notches 16 in the end walls 18 which facilitate finger access to the slides for removal from the box. The illustrated embodiment accommodates the standard 2 x 2 slide mount, but it will be appreciated that other slide mounts can be accommodated merely by changes in dimensioning of the box.

When the cover 12 is inverted as shown in FIG. 3, it becomes a simple viewer characterized by bottom 20, end walls 22, 24 and side walls 26, 26. The end wall 22 has an aperture 28 therein with a generally radial notch 30 permitting the rearwardly spaced tabs or ears 32 on the back of plastic lens 14 to be passed behind the cardboard wall 22 as the lens is rotated until both tabs or ears 32 are behind the material of the wall to thereby mount the lens 14 in the front wall. The opposed rear wall 24 has a reduced vertical height insuring against obstructing transmitted light passing through the transparency 34 carried in mount 36 when it is disposed either vertically or horizontally.

The side walls 26 slope downwardly and rearwardly from the front wall to the back wall and, of course, are in the neighborhood of two inches in length since this is the size of the slide mount to be contained in the box. This, therefore, indicates a focal length for lens 14 in the neighborhood of two inches and the lens does, of course, provide a magnification factor. It will be noted that each side wall is folded over at the top and then run down to the bottom 20 where the material (cardboard) runs across to the medial line 38. The material from the inside fold of the wall 26 is die cut in fabrication to provide a tab 40 adjacent each rear corner and this tab is spaced from the rear wall 24 and yet, because of the resiliency of the cardboard, tends to press against the rear wall 24. Therefore, when the slide mount 36 is placed between the tabs 40 and the rear wall, the tabs serve to retain the slide mount in a vertical position in the proper vertical viewing plane, as may be seen best in FIGS. 3 and 4.

The use of the cover as a viewer should be quite clear from FIG. 3, it being understood that the slide is viewed by transmitted light and hence the user faces toward the light source. This permits the customer to view his slides immediately on receipt of the slides without any extra viewers or projectors. The cost of the plastic lens is extremely low and, of course, the cardboard box is not expensive and hence the added utility of the combined file box and viewer is had at a very modest cost.

While the foregoing description has been directed towards a cardboard box construction, it will be appreciated that the box could readily be fabricated out of plastics or other materials. Indeed, if desired, the entire cover could be fabricated out of transparent plastic and the lens could be molded into the cover.

Although but a single embodiment of the present invention has been illustrated and described, it will be apparent to those skilled in the art that various changes and modifications may be made therein without departing from the spirit of the invention or from the scope of the appended claim.

I claim:
A carton comprising:
   telescoping members each having a bottom and four side walls and being sized to serve as a container for mounted transparencies of a given size;
   one of the members having an aperture in one of its walls;
   a lens mounted in said aperture;
   the wall of said one member opposed to said one wall having an opening therein of such size as to not overlie any portion of a mounted transparency when any edge of the transparency mount is held against the bottom adjacent said opposed wall to thereby allow viewing the transparency by transmitted light by viewing the transparency through the lens;
   said one wall and the opposed wall being separated by approximately the focal length of the lens,
   and a tab projecting from each side wall adjacent said opposed wall and being self-biased towards the op- posed wall for yieldingly holding a mounted transparency between the tabs and the opposed wall normal to the optical axis of the lens.

References Cited

UNITED STATES PATENTS

| | | | |
|---|---|---|---|
| 2,882,628 | 4/1959 | Fowle | 40—106.1 |
| 3,061,961 | 11/1962 | Cohen | 40—63 |

FOREIGN PATENTS 11,139    5/1907    Great Britain.

EUGENE R. CAPOZIO, *Primary Examiner.*

W. J. CONTRERAS, *Assistant Examiner.*